Oct. 3, 1967
F. H. CARY
3,344,808
COMBINED BUTTERFLY AND CHECK VALVE
Filed Nov. 23, 1964
2 Sheets-Sheet 1
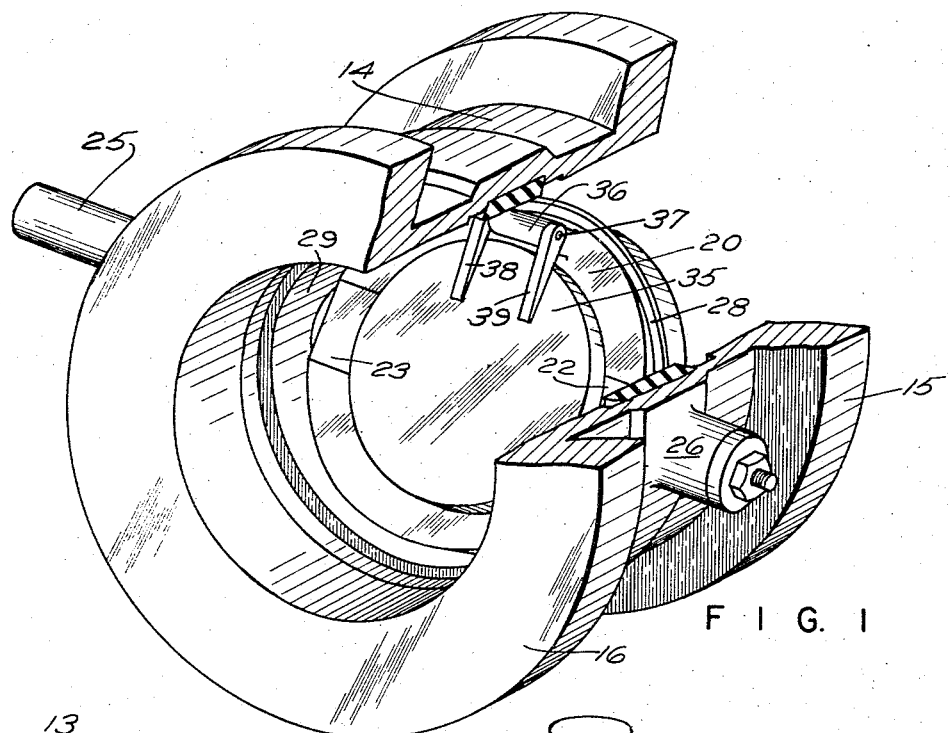
FIG. 1
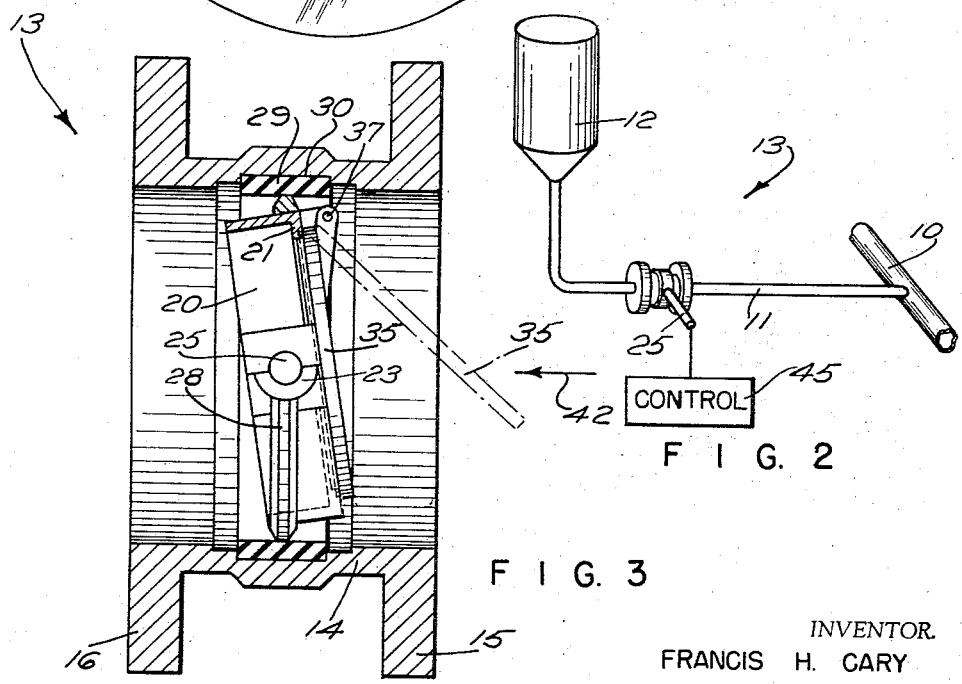
FIG. 3
FIG. 2
INVENTOR.
FRANCIS H. CARY
BY
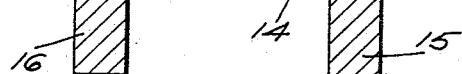
ATTORNEYS Oct. 3, 1967  F. H. CARY  3,344,808
COMBINED BUTTERFLY AND CHECK VALVE
Filed Nov. 23, 1964  2 Sheets-Sheet 2

INVENTOR.
FRANCIS H. CARY
BY
Barlow & Barlow
ATTORNEYS

United States Patent Office 3,344,808
Patented Oct. 3, 1967

3,344,808
COMBINED BUTTERFLY AND CHECK VALVE
Francis H. Cary, Hope, R.I., assignor to The New York Air Brake Company, a corporation of New Jersey
Filed Nov. 23, 1964, Ser. No. 413,050
3 Claims. (Cl. 137—599.2)

ABSTRACT OF THE DISCLOSURE

A butterfly and check valve which is so mounted on shafts extending outwardly diametrically of the closure vane as to permit a wide opening in the closure vane for reverse flow of fluid controlled by the vane.

This invention relates to a valve of the type often referred to as a butterfly valve but so constructed that it also acts as a check valve in certain applications.

One of the objects of this invention is to provide a valve which will be positively controlled for the flow of fluid through the valve in one direction but which will permit the flow of fluid in the opposite direction should the pressures become such that such flow in such opposite direction may occur.

Another object of this invention is to combine the functions of a butterfly valve which is positively controlled and the functions of a check valve.

Another object of the invention is to provide a valve which will provide a quicker operation in response to pressure changes than were it necessary to swing the vane of the butterfly valve for the flow of the fluid therethrough.

With these and other objects in view, the invention consists of certain novel features of construction as will be more fully described and particularly pointed out in the appended claims.

In the accompanying drawings:

FIG. 1 is a perspective view broken away to show the construction of the valve which is the subject of this invention;

FIG. 2 is a perspective, partially schematic view illustrating an auxiliary tank and the valve of the invention in the branch line of the system leading thereto;

FIG. 3 is a central sectional view of the valve in the same position as shown in FIG. 2 and illustrated in dot-dash lines the check portion of the valve as moved to open position;

Figure 4:
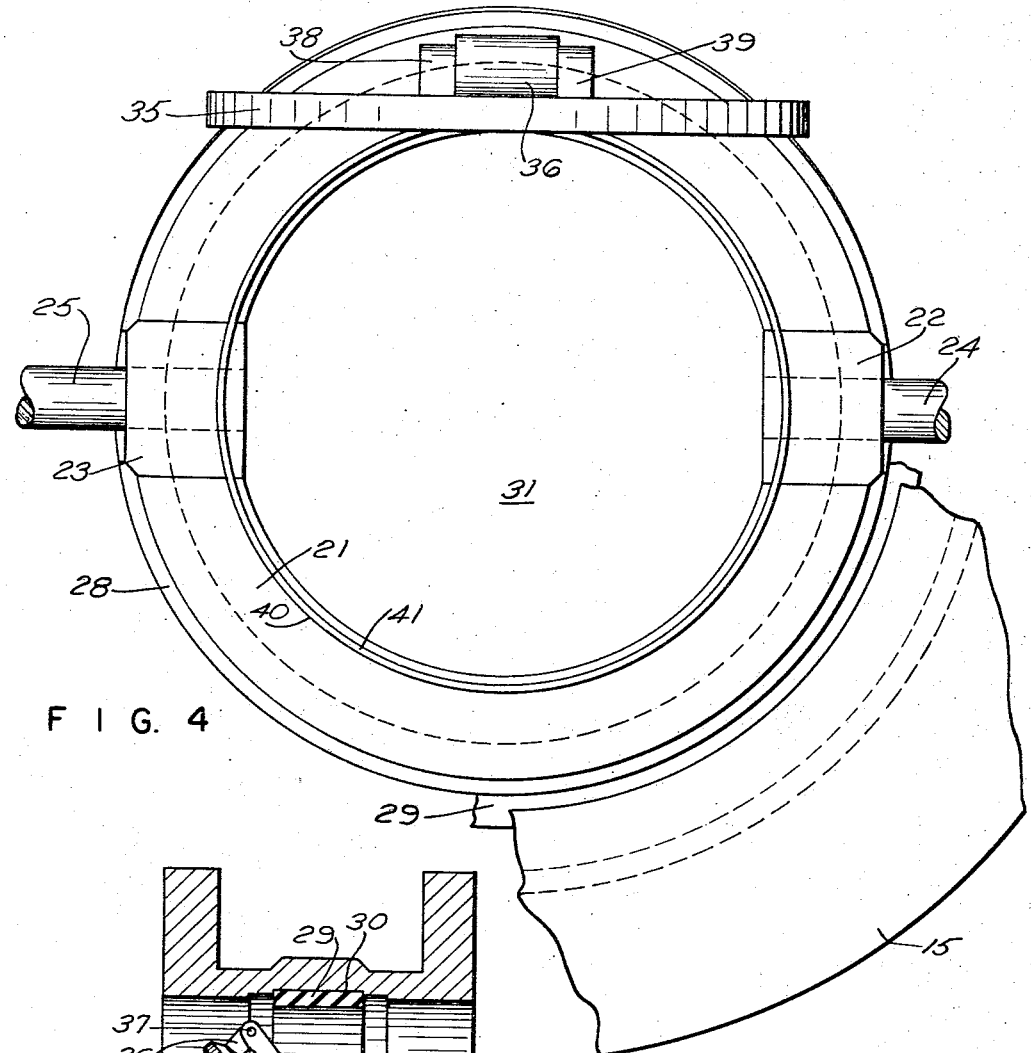
FIG. 4 is an end view of the valve partly broken away and showing the flapper of the check portion in open position.

In proceeding with this invention, I have placed a check valve in the vane of a butterfly valve which controls the flow therethrough.

In FIG. 2 there is illustrated a fragmental portion of a conduit 10 in a pressure system such, for instance, as the flow of water to supply some given apparatus, and from this main supply line 10, which is usually existent under a certain amount of pressure, there is a branch 11 extending to an auxiliary supply 12, and in this branch line 11 there is positioned a valve 13 which is the subject of this invention. The valve 13 is in the same position in FIG. 2 as it is in FIG. 3 so that the valve may be easily seen as to the relative positions of the parts thereof.

The valve 13 comprises a body 14 with flanges 15 and 16 for mounting it in conduits which it is to serve.

A vane 20 comprising an annulus with an inturned lip 21 is provided with bosses 22 and 23 at diametrically opposite points for receiving the stub shaft portions 24 and 25 which extend through the body portion 14 into the bearings 26 protruding outwardly from the portion 14 of the body. These shafts are fixed in the bosses 22 and 23 so that rotary movement of the shafts will tend to move the vane with the shafts relative to the body. A rib 28 is fixed to the outer surface of the annulus but is at an angle or inclined with reference to the center plane of the annulus as can be clearly seen in FIG. 3. This rib is of a size to engage the rubber bushing 29 fixed in a recess 30 in the inner surface of the body, and it will be observed that when this rib is in a plane at right angles to the axis of the body as shown in FIG. 3 and in contact with the rubber bushing, the vane will be in its closed sealing position, although the main annulus of the vane will be at an angle to the axis of the body as shown in FIG. 3. The bosses 22 and 23 are of a shape to conform to the inner surface of the rubber bushing 29 so as to maintain a tight seal therewith even though the vane is rotatable about the axis of the shafts 24, 25. This vane has the lip 21 extending a short distance inwardly so as to provide an opening 31 through the vane which is closed by a flapper 35 as will be presently described.

A lip 21 is on the upper or high side of the inclination of the annulus as shown in FIG. 3, and from this side of the annulus there protrudes a boss 36 (FIGS. 1 and 4) through which a pin 37 extends to pivotally mount the arms 38 and 39 which are attached to the flapper 35 so as to pivotally mount this flapper on the vane 20. The undersurface of this flapper and the surface of the lip provide a mating fit to provide a seal when the flapper is in closed position such as shown in full lines in FIG. 3. This sealing may be accomplished by providing a groove 40 in the surface of the lip 21 nearest to the flapper and extending across the bosses 22, 23 and the insertion of a rubber gasket 41 therein.

Figure 5:
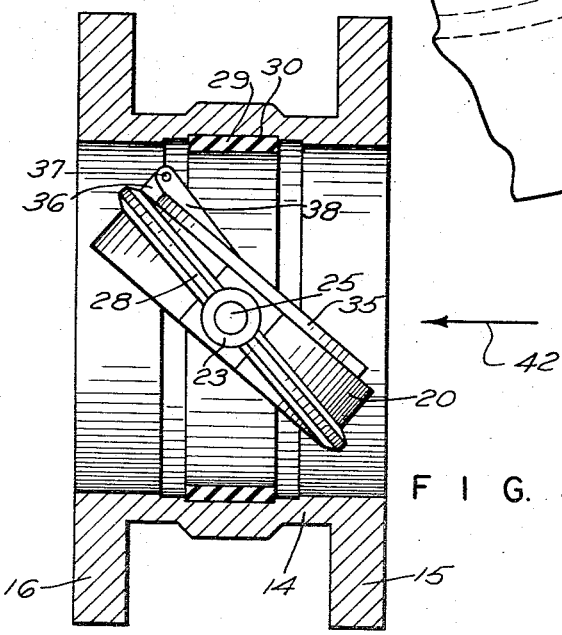
FIG. 5 is a sectional view similar to FIG. 3 showing the vane in open position and the flapper of the check portion closed.

For better understanding the operation of this valve, reference may be had to FIG. 2 where the conduit 10 will be assumed to be at a pressure sufficient to perform its purpose and to fill the auxiliary tank, and when it is desired to fill the auxiliary supply 12, there will be either a manual or mechanical operation for turning the shafts 25 and 24 at the point 45 marked "CONTROL" so that the pressure from the line 10 may pass the vane and valve 13 after the same is opened and in the position shown in FIG. 5 until there is a sufficient amount of water in the auxiliary supply 12, whereupon the vane 20 will be closed by means of the control 45. The pressure in the main line 10 will be sufficiently greater than the pressure in the auxiliary supply 12 so that it will maintain the check valve or flapper 35 closed when in the position shown in FIGS. 2 and 3 by reason of the pressure being in the direction of the arrow 42. However, should the pressure in the main system (a portion of which is shown at 10) drop below the pressure supplied by the auxiliary supply at 12, then immediately the flapper 35 or check valve will permit a flow of the auxiliary supply back into the main system, and there will be no sudden drop of pressure due to the slow operation of the butterfly or vane 20 even though it were operated automatically through some sort of controls due to the change of pressure, thus providing a very simple control of a system where the auxiliary supply is readily available should the pressure in the main system fail.

I claim:

1. A valve for a flow line comprising a body through which fluid may flow, a vane of a size to block the flow of fluid through said body, stub shafts attached to said vane at diametrically opposite locations and extending radially of the vane on the same axis and journaled in said body for moving said vane relative to said body upon the application of rotative force to said shaft for open or closed position therein, said vane having a central opening therethrough, a flapper pivoted on said vane closing said opening but movable relative to said vane from said closed position to open position upon the occurrence of fluid pressure greater on the side tending to open the flapper than the other side of said flapper.

2. A valve as in claim 1 wherein said vane is an annulus with a sealing rib at an angle to its central plane so as to dispose said annulus at an inclination to a plane at right angles to the axis of said body when in closed position.

3. A valve as in claim 2 wherein the shafts are horizontal providing a high and low side of the vane and the flapper is pivoted on the high side of said vane and so pivoted that it tends to move by gravity to closed position.

References Cited

UNITED STATES PATENTS

| | | | |
|---|---|---|---|
| 1,671,069 | 5/1928 | De Wein | 251—305 X |
| 2,140,734 | 12/1938 | Chandler | 137—599.2 |
| 3,030,066 | 4/1962 | Swain | 251—306 X |

FOREIGN PATENTS

| | | |
|---|---|---|
| 670,327 | 1/1939 | Germany. |
| 3,815 | 12/1872 | Great Britain. |

WILLIAM F. O'DEA, *Primary Examiner.*

D. H. LAMBERT, *Assistant Examiner.*